(12) United States Patent
Iranpour

(10) Patent No.: US 6,834,236 B2
(45) Date of Patent: Dec. 21, 2004

(54) PARAMETRIC FK TECHNIQUES FOR SEISMIC APPLICATIONS

(75) Inventor: Kambiz Iranpour, Oslo (NO)

(73) Assignee: WesternGeco L.L.C., Houston, TX (US)

(*) Notice: Subject to any disclaimer, the term of this patent is extended or adjusted under 35 U.S.C. 154(b) by 0 days.

(21) Appl. No.: 10/393,510

(22) Filed: Mar. 20, 2003

(65) Prior Publication Data

US 2003/0225524 A1 Dec. 4, 2003

Related U.S. Application Data

(60) Provisional application No. 60/368,122, filed on Mar. 27, 2002.

(51) Int. Cl.$^7$ .................................................. G01V 1/28
(52) U.S. Cl. ............................................................ 702/17
(58) Field of Search ............................ 702/14, 15, 17; 367/73

(56) References Cited

U.S. PATENT DOCUMENTS

| | | | |
|---|---|---|---|
| 5,191,526 A | 3/1993 | Laster et al. ................. | 364/421 |
| 5,253,192 A | * 10/1993 | Tufts ........................... | 708/403 |
| 5,892,732 A | 4/1999 | Gersztenkorn ............... | 367/72 |

OTHER PUBLICATIONS

"Frequency–wavenumber–analysis", website www.uni-geophys.gwdg.de/~srost/diss 01/node 28.html, pp. 1–5.
"One Dimensional Spectral Analysis of Seismic Surface Waves", www.zywicki.com/research.htm, by Daren J. Zywicki, pp.1–2.

PCT Search Report dated Sep. 4, 2003, No. PCT/US 03/08351.

IEEE Transactions on Signal Processing, vol. 43, No. 7, Jul. 1995, pp. 1728–1732.

K.J. Manfurt and R. Lynn Kirlin; *3–D Broad–band Estimates of Reflector Dip and Amplitude*, Geophysics, vol. 65, No. 1 (Jan. and Feb. 2000); pp. 304–320.

M. Allam and A. Moghaddamjoo; *Spatial–Temporal DFT Projection for Wideband Array Processing*; IEEE Signal Processing Letters, vol. 1, No. 2, Feb. 1994, pp. 35–37.

D.R. Fuhrmann; *Adaptive Music*; Electronic Systems and Signals Research Lab., Washington Univ., St. Louis, Mo; SPIE vol. 826, Advanced Algorithms and Architectures for Signal Processing II (1987), pp. 92–95.

* cited by examiner

Primary Examiner—Donald McElheny, Jr.
(74) Attorney, Agent, or Firm—Moser, Patterson & Sheridan

(57) ABSTRACT

The present invention provides methods to be used in seismic data processing to address problems encountered during data acquisition from a limited number of receivers. The present invention applies parametric methods to provide superior wavemember resolution.

28 Claims, 3 Drawing Sheets

PARAMETRIC FK TECHNIQUES FOR SEISMIC APPLICATIONS

CROSS-REFERENCE TO RELATED APPLICATIONS

This application claims benefit of U.S. provisional patent application Ser. No. 60/368,122, filed Mar. 27, 2002, which is herein incorporated by reference.

BACKGROUND OF THE INVENTION

Records of arrays are used to measure wavefields and extract information about the medium through which the wavefield propagates. In seismology, array analyses have been applied in the estimation of seismic scatter distribution, measurements of surface wave dispersion, measurements of seismic wavefields associated with volcanic activity, estimation of earthquake rupture propagation, and other analyses.

Techniques of array analysis generally may be divided into two categories, depending on whether they operate in a frequency domain or in a time domain. In particular, frequency domain approaches have the capability of resolving multiple signals arriving simultaneously at an array due to multipathing or use of multiple sources.

One of the simplest frequency-wavenumber methods is the beamforming or conventional method. The estimated power spectrum can be shown to be a convolution of the array response with the true power spectrum. Here the array response is determined completely by the number of sensors and spatial distribution. Because the array response has a broad beam width for the incident signal's wavenumber and side lobes, the power spectrum estimated by the conventional method is blurred by the array response.

The minimum variance distortionless method has been shown to produce significantly higher resolutions for a single identified wave than the resolution produced by the conventional method. However, the resolving power of the minimum variance distortionless method is similar to that of the conventional method when multiple waves are present. For the resolution of multiple signals, a signal subspace approach was proposed, referred to as multiple signal characterization (MUSIC) (see, e.g., Johnson and Dudgeon Prentice-Hall Signal Processing Series, ISBN 0-13-048513-6). Key to the performance of MUSIC is the division of information in the spatial cross-covariance matrix of the Fourier coefficients into two vector subspaces—a signal subspace and a noise subspace. The MUSIC approach allows for high-resolution estimates of the power spectrum since it does not convolve the true spectrum with the array response.

Methods to generate high-resolution frequency-wavenumber spectra and higher dimension extension frequency-wavenumber-wavenumber spectra are needed in the art of seismic analysis. The methods of the present invention satisfy this need.

SUMMARY OF THE INVENTION

In seismic data analysis, using a small number of sensors to generate high-resolution frequency-wavenumber (fk) spectra and higher dimension extension frequency-wavenumber-wavenumber (fkk) spectra is highly desirable and has wide-ranging applications. Such applications include local velocity measurements and the detection of dispersive waves. When relatively few samples are available, parametric methods provide a superior wavenumber resolution compared to a standard fk-transform. Parametric methods such as the multiple signal classification (MUSIC) method can be applied to wavenumber-wavenumber or wavenumber estimation at each frequency in order to generate the algorithms fkk-MUSIC and fk-MUSIC and many other parametric algorithms for use in seismic applications. In addition, parametric methods may be extended to fkkk or sparse/irregular arrays. The techniques of the present invention prove to be useful tools whenever estimating local velocities involves data from a limited number of receivers.

Thus, the present invention provides a method of seismic analysis comprising a temporal Fourier transform and a spatial estimation based on a parametric algorithm. In one embodiment of the present invention, the parametric algorithm is MUSIC. In one aspect of this embodiment of the present invention, the parametric algorithm is applied to data from equidistant spatial sampling. In another aspect of this embodiment of the present invention, the parametric algorithm is applied to data from sparse spatial sampling. In this embodiment of the invention, the data is fed into the parametric algorithm as an MN×L matrix, wherein MN is the number of sensors in a two dimensional array and L is the number of samples per sensor. Also in this embodiment of the present invention, the Fourier transform is implemented on each of the traces, and the parameters passed to the parametric algorithm are selected from the group of order of Fourier transform, sampling frequency, distance between receivers in an x direction, distance between receivers in a y direction, number_of_sources, or f_span.

Alternative embodiments of the present invention apply other parametric methods including, but not limited to, the Minimum Variance algorithm, Eigenvector algorithm, Maximum Likelihood algorithm, Pisarenco algorithm, the ARMA (Autoregressive Moving Average Algorithm), AR or MA algorithms and the Maximum Entropy algorithm.

A BRIEF DESCRIPTION OF THE DRAWINGS

A more particular description of the invention, briefly summarized above, may be had by reference to the embodiments of the invention described in the present specification and illustrated in the appended drawings. It is to be noted, however, that the specification and appended drawings illustrate only certain embodiments of this invention and are, therefore, not to be considered limiting of its scope. The invention may admit to equally effective embodiments.

FIG. 1 is a flow chart of one embodiment of the methods of the present invention.

FIG. 2 demonstrates that an fast Fourier transform-based beamforming estimate of the $k_x$–$k_y$ cannot distinguish two events at a frequency of 9 Hz.

FIG. 3 demonstrates that the parametric method, MUSIC, can distinguish the two events observed in FIG. 2. The approximate velocities are in accordance with the velocities of the two events in the synthetic data. The array consisted of 2×2 elements.

DETAILED DESCRIPTION OF THE INVENTION

Reference will now be made in detail to exemplary embodiments of the invention. While the invention will be described in conjunction with these embodiments, it is to be understood that the described embodiments are not intended to limit the invention solely and specifically to only those embodiments. On the contrary, the invention is intended to cover alternatives, modifications, and equivalents that may be included within the spirit and scope of the invention as defined by the attached claims.

The present invention applies parametric methods such as the MUSIC algorithm, Minimum Variance algorithm, Eigenvector algorithm, Maximum Likelihood algorithm, Pisarenco algorithm, the ARMA, AR or MA algorithms and the Maximum Entropy algorithm to wavenumber-wavenumber or wavenumber estimations in order to generate algorithms such as fkk-MUSIC and fk-MUSIC and other parametric algorithms useful in seismic applications. As used herein, the term "parametric algorithms" refers to mathematical models that describe a signal and use acquired data to determine the parameters for the model. Conventional nonparametric spectral estimation methods similar to the Power Spectral Density estimate (PSD) and second-order statistics such as autocorrelation (ACF) assume that data outside the observation window are zero. Such an assumption limits the resolution of the spectral estimate. On the other hand, parametric methods make assumptions about data outside the observation window according to a model that describes unobserved data in various ways depending on the method. The description of unobserved data is based on first, existing information about the observed data and the process used to generate the observed data, and second, estimated parameters specific to the assumed model. (See, e.g., S. Kay, *Modern Spectral Estimation*, Prentice-Hall Signal Processing Series ISBN 0-13-598582-X).

Figure 1:
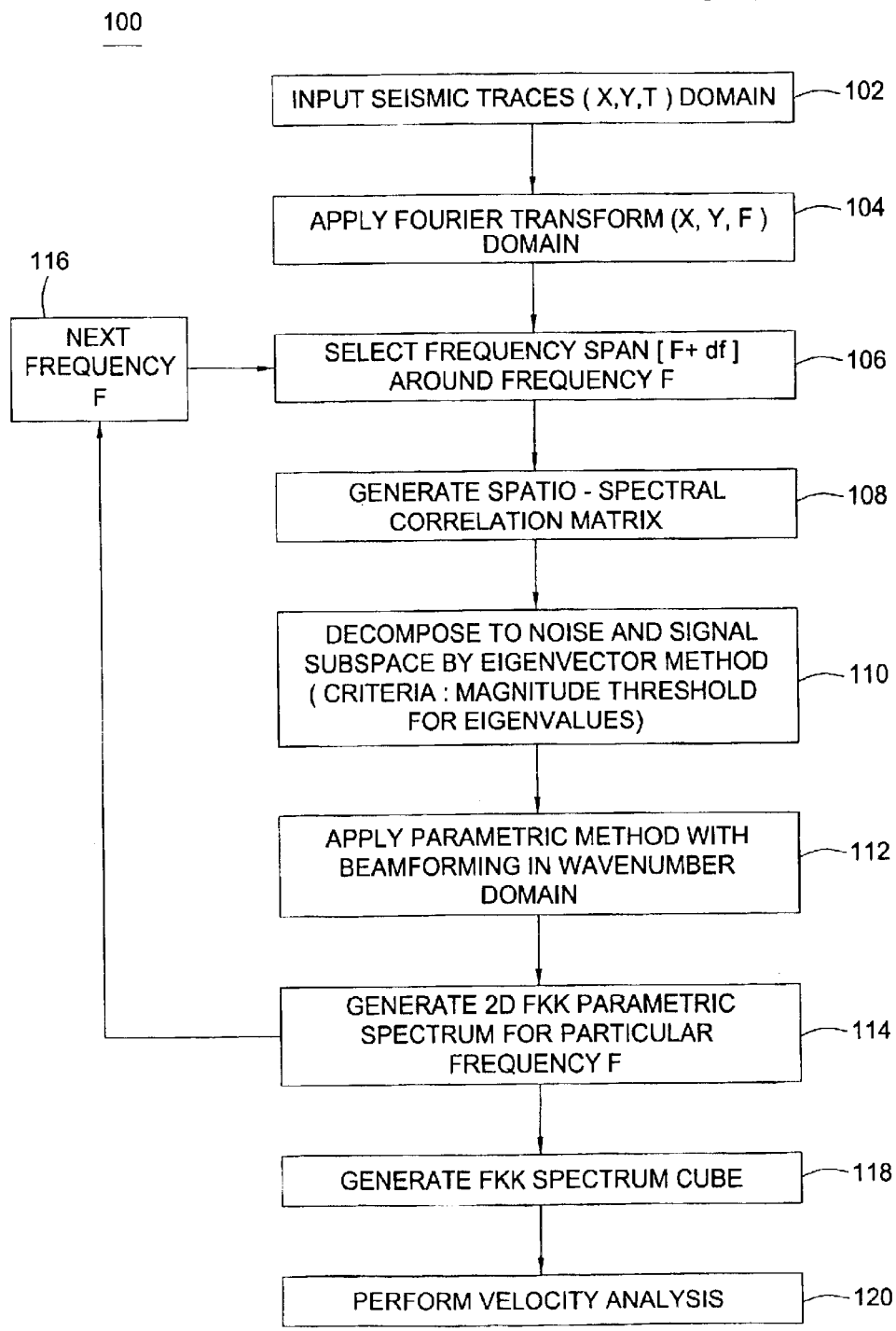

FIG. 1 is a flow chart showing one general embodiment of the method of the present invention (100). First, at step 110, seismic traces are acquired from a 2D array of sensors, and a Fourier transform is applied to the traces at step 120. Next, a frequency span is selected around frequency F (106), and a spatio-spectral correlation matrix is generated (108) and then decomposed to a noise and signal subspace by the eigenvector method (110). In the next step, a parametric method is applied with beamforming in the wavenumber domain (112) and a two-dimensional parametric spectrum for the particular frequency F is generated (114). At this juncture, another frequency F may be chosen (116), and steps 106, 108, 110, 112 and 114 are applied to this new frequency F. Alternatively, a spectrum cube is generated (118) from the parametric spectrum at 114, and, finally, velocity analysis is performed (120).

In general, a high-resolution fk-spectrum or fkk-spectrum requires a wide temporal and spatial window (recording period) and adequate sampling. In seismic data acquisition, the temporal sampling and recording period are usually not a problem, and the sampling frequency is typically much higher than the frequencies of Interest. However, spatial sampling is often limited. Furthermore, it is sometimes desirable to reduce the spatial extent in an fkk or fk transform due to the spatially non-stationary nature of the data and the need for local estimation analysis. The present invention rewrites parametric methods to generate high-resolution algorithms fkk-MUSIC and fk-MUSIC with a significantly small spatial aperture.

First, a two dimensional (2D) spread should be considered. A 2D spread can be used in a small $k_x$–$k_y$ estimation. A one dimensional (1D) spread or a linear array can be seen as a special case of a 2D spread. Herein, uniform 2D arrays are assumed to have M×N elements with the special case of N=1; essentially a 1D array consisting of M elements. However, the elements can be extended to sparse or irregular 2D and 1D arrays. Parametric techniques, when applied to a spread with a limited aperture and with very few receivers, generate far superior estimates of $k_x$–$k_y$ compared to classical methods, such as the fast Fourier transform (FFT)—based beamforming technique. one advantage of using fkk-MUSIC or the 1D fk-MUSIC methods is the superior resolution of events that is provided by these particular plots.

Parametric techniques of the present invention for the wavenumber-wavenumber (kk) estimation are based on a similar application used by Direction Of Arrival (DOA) techniques (see, e.g., Nikias and Petropulu, Prentice-Hall Signal Processing Series, ISBN0-13-678210-8). The difference between the fk-MUSIC techniques and the DOA techniques is that in DOA techniques, the beamforming is performed by stepping through possible angle of arrivals, whereas in the present invention the beamforming steps through the wavenumber, k, space. Also in DOA techniques, velocity in the medium is assumed to be approximately constant and, thus, the spatial correlation matrix uses the time data. However, in the present invention, the spatio-spectral matrix is built up before the wavenumber beamforming in order to resolve the wavenumber at each frequency. This allows generation of fkk-MUSIC and fk-MUSIC estimates—or any other fkk or fkk algorithm where k is estimated using parametric methods.

The 2D Fourier transform acquired by a 2D array of a spatial measurement in an instant in time converts the spatially-sampled data to the wavenumber-wavenumber (kk) domain, with each axis determined by the corresponding spatial sampling. If the measurements are also continuously sampled in time, a 3D Fourier transform converts the data into the fkk domain.

The wavenumber axes span both the negative and positive wavenumbers. The positive and negative wavenumbers imply opposite directions of arrivals relative to the normal line that passes through the midpoint of the array. The Nyquists of the wavenumber axes are determined by the spatial sampling period; i.e., the distance between the neighboring sensors in each direction. For a uniform rectangular 2D array stretched in the x and y directions, the wavenumber axes represent the apparent wavenumbers measured by sensors located along those directions.

The apparent wavenumber axes cover the spans [−1/(2dx) 1/(2dx)] and [−1/(2dy) 1/(2dy)], where dx and dy are the distances between the neighboring sensors in x and y directions. If the sensors are not equidistant, then dx and dy are the shortest distances found in those directions between any two neighboring sensors.

The resolution of the conventional beamforming techniques, the mainlobe, is determined by the dimensions of the aperture. Modern spectral estimation techniques are used in the present invention to enhance the resolution of wavenumber estimation. This enhancement in the resolution is equivalent to an effective increase in the aperture's dimensions.

Correlation matrices consist of two major classes: spatio-temporal and spatio-spectral. Elements $R_{ij}$ in a spatio-temporal correlation matrix define the correlation between the time samples belonging to the sensor i with the time samples of the sensor j. Spatio-spectral correlation matrices are usually constructed by first taking the Fourier transform of the time-sampled series of each sensor prior to calculating the correlation matrix. Each element in this matrix then defines the cross-spectra of the elements i and j. The correlation delays between the sensors are then converted to sensor-dependent phase shifts in the Fourier domain.

$$Y=[Y_{1l}\ Y_{2l}\ \ldots\ Y_{i1}\ \ldots\ Y_{M1}\ \ldots\ Y_{12}\ Y_{22}\ \ldots\ Y_{i2}\ \ldots\ Y_{M2}\ \ldots\ Y_{1N}\ Y_{2N}\ \ldots\ Y_{iN}\ \ldots\ Y_{MN}]^T$$

$Y_{ij}$ vector is the fast Fourier transform (FFT) of the time samples belonging to the ij sensor in the 2D array. Thus we have $R(\omega)=Y(\omega)\ Y'(\omega)$. Y' is the conjugate transpose of Y. $R(\omega)$ is an MN×MN matrix and is a function of the angular frequency $\omega$. Applying the steering vector e in the form of e'Re, where e' is the conjugate transpose of the e vector defined by $e=[\exp(-jk.r_0)\ \ldots\ \exp(-jk.r_{MN-1})]^T$, the spatial Fourier transform operator at k, the quadratic form e'Re is derived. r defines the position of the sensor in the xy plane. This quantity is called quadratic since $P(k,\omega)=e'Re=e'YY'e=|e'Y|^2$. $P(k,\omega)$ is an estimate of power at k and $\omega$. For $k=(k_x,k_y)$, the steering vector, e, is defined by:

$$e(k_x,k_y)=[\exp(-j(k_x x_0+k_y y_0))\ \ldots\ \exp(-j(k_x x_{MN-1}+k_y y_{MN-1}))]^T.$$

Since the seismic source is also broadband, the wave-number for each frequency component must be estimated. In the present invention, a spatio-spectral correlation matrix is chosen instead of a spatio-temporal correlation matrix so as to develop a technique that replaces the Fourier transforms in the space with the results from the modern spectral estimation methods when estimating the wavenumbers $k_x$, and $k_y$.

Since correlation matrices have Hermitian symmetry (R'=R) and are usually positive definite (X'Rx>0 for $\forall x\neq 0$), the eigenvectors of correlation matrices are orthogonal with respect to the matrix and the eigenvalues are usually positive:

$$v_i'Rv_j=\lambda_i\delta_{ij}\ \text{and}\ v_i'v_j=\delta_{ij};$$

R can be defined by its eigensystem:

$$R=\Sigma_{ij=1\ \ldots\ MN}\lambda_i v_i'v_j\ \text{and}\ R^{-1}=\Sigma_{ij=1\ \ldots\ MN}\lambda_i^{-1}v_i'v_j.$$

For a 2D array, with MN receivers, the conventional beamformer's steered response can thus be written in the following form: $e'Re=\Sigma_{i=1\ \ldots\ MN}\lambda_i|e'v_i|^2$.

In eigenanalysis, eigenvalues are sorted in the order of the magnitude of their values. The lowest eigenvalues are then attributed to noise. The classification of eigenvalues into groups of either signal- or noise-related eigenvalues is done by plotting the sorted values and finding a threshold that corresponds to the noise floor. Performing regular Fourier transform operations (spatial), prior to performing eigenanalysis, can help determine this threshold. The corresponding eigenvectors are then arranged alongside their eigenvalues. The largest eigenvalues are also affected by the noise level. However, the eigenvectors corresponding to the largest eigenvalues are determined only by the direction of propogation of signals. The space defined by all the eigenvectors is thus divided into noise and signal subspaces. Since the magnitudes of the eigenvalues corresponding to the signals are also affected by the noise level, the signal subspace is often called the signal-plus-noise subspace. Herein, the signal-plus-noise subspace will be referred to as the signal subspace in order to avoid any ambiguity, particularly as the signal amplitude is less of a concern than the estimation of the wavenumber.

The Minimum Variance spectrum can be written in the following form in terms of the eigenvalues and eigenvectors of the correlation matrix R:

$$P_{MV}(k)=[\Sigma_{i=1\ \ldots\ Ns}\lambda_i^{-1}|e'(k)v_i|^2+\Sigma_{i=Ns+1\ \ldots\ MN}\lambda_i^{-1}|e'(k)v_1|^2]_{-1}$$

Ns is the number of distinct wave-numbers in the signal subspace. In the above expression, the second "sum" covers the noise subspace. When e(k) is steered towards the correct propagation wave-number, the first sum increases in value while the second sum decreases. Since the reciprocal of the expression inside the brackets is of interest, zeroing the first expression enhances those peaks that are related to the propagation wave-numbers. The explanation is related to the behavior of the second "sum" in this expression. When e(k) is aligned with the correct wavenumber, the second sum becomes negligible and thus its reciprocal becomes conspicuous. Using DOA terminology, the reason for this is that any direction of signal propagation is ideally orthogonal to the noise subspace. Thus the eigenvector method provides:

$$P_{EV}(k)=[\Sigma_{i=Ns+1\ \ldots\ MN}\lambda_i^{-1}|e'(k)v_i|^2]^{-1}$$

By whitening the noise subspace and by replacing all the eigenvalues belonging to the noise subspace with 1, the MUSIC parametric method is created (again, see, Johnson an Dudgeon, Prentice-Hall Signal Processing Series, ISBN 0-13-048513-6). As is clear from the assumptions behind this method, the spectrum shows equal amplitude for all the signals and an equal flat noise floor; thus, any information about the amplitude is lost.

$$P_{MUSIC}(k)=[\Sigma_{i=Ns+1\ \ldots\ MN}|e'(k)v_1|^2]^{-1}$$

Thus, the present invention provides an algorithm for seismic applications that is a replacement for a 3D Fourier transform. It keeps the temporal Fourier transform while it substitutes the spatial Fourier transforms with estimations based on parametric techniques. The result is fkk estimates using parametric methods, like fkk-MUSIC and the special case of the one dimensional array technique fk-MUSIC.

Data is fed into the algorithm as an MN×L matrix, with MN being the number of receivers (traces) and L being the number of samples per sensor. In this algorithm, a Fourier transform operation is implemented on each trace, resolving the frequency aspect first. The order of the fast Fourier transform ("NFFT" or Number of FFT) parameter is passed to the algorithm. Examples are 8192 or 512, etc. (i.e., $2^n$ with n being an integer).

Other parameters passed to the algorithm are "Fs" (the sampling frequency), dx (the distance between the receivers in x direction), dy (the distance between the sensors in y direction), "number_of_sources" and the "f_span". The algorithm in its current form accepts equidistant spatial sampling; however, the algorithm easily can be extended to work with sparse spatial sampling and various geometries.

After the Fourier transform operation resolves the temporal frequency, the wavenumbers must be resolved. The resolution f_span passed as a parameter to the algorithm determines df or the resolution selected in the temporal frequency domain for the estimation of the wavenumbers. The wavenumber spectrum is estimated inside the df span. If NFFT is chosen to be 8192, the f_span parameter can be chosen to be, for example, 10, dividing the Nyquist space to 4096/10 partitions. This translates to a resolution of df=10/4096 of the Nyquist space. If the NFFT is chosen to be 512, then choosing the value 2 for the f_span parameter is more appropriate, thus making df=2/256 of the Nyquist. It is inside this [f f+df] frequency span that the wavenumbers are resolved. If df is too large, the task of estimating the wavenumber inside this frequency window may result in inaccurate estimations. The [f f+df] vectors from each trace are used in order to generate the spatio-spectral correlation matrix central to all beamforming techniques.

The parameter "number_of_sources" tells the algorithm how many distinct wavenumbers are expected. This parameter cannot be greater than the number of traces. If "number_of_sources" is chosen to be 1, it means that only 1 eigenvalue is regarded as belonging to the signal subspace. The correlation matrix is accordingly modified and the modified correlation matrix is then used by different beamforming techniques.

The algorithm can generate fkk-MUSIC, fkk-Minimum Variance, fkk-Maximum Likelihood and fkk-Eigenvalue estimates at different stages. The choice of method depend, for example, on the signal-to-noise ratio, the number of sensors used, the type of noise and application. Except for the classical beamforming method when there are too many receivers the outputs can result in many spurious peaks. For many receivers, fkk operation or the related classical beamforming method may be optimal.

EXAMPLE

Application of the fkk-Parametric (fkk-MUSIC)

The fkk method generates a $k_x$–$k_y$ profile at each frequency. For display purposes, a cross-section of the fkk results at a single frequency is presented.

Figure 2:
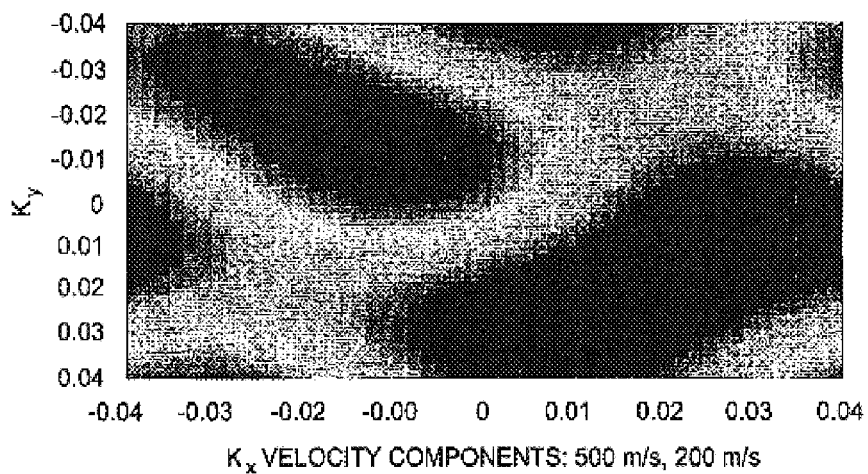
Figure 3:
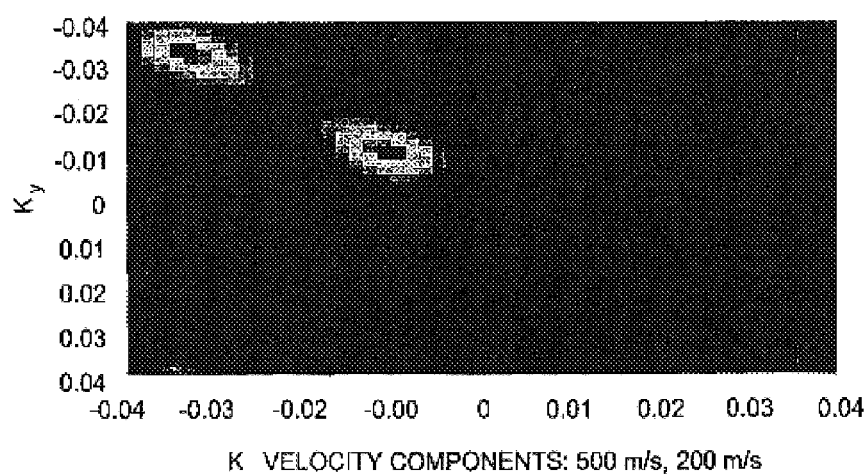

The results presented herein illustrate how a parametric method such as MUSIC can distinguish between two separate arrivals where the classical beamforming technique (fast Fourier transform-based) is unable to do so. Synthetic data were used with two events traveling at 200 m/s and 500 m/s. A 2×2 array was used. The wavelet used for the arrivals was a Ricker wavelet. The distances between the receivers, dx and dy, were set to 12.5 meters. The result for the beamforming technique is illustrated in FIG. 2. That the two events cannot be distinguished is evident from this figure. On the other hand, FIG. 3 illustrates the result of applying the MUSIC parametric technique on this synthetic data. The technique easily distinguishes the two events. Knowing that the array consists of only 2×2 receivers, the result is quite impressive.

Figure 4:
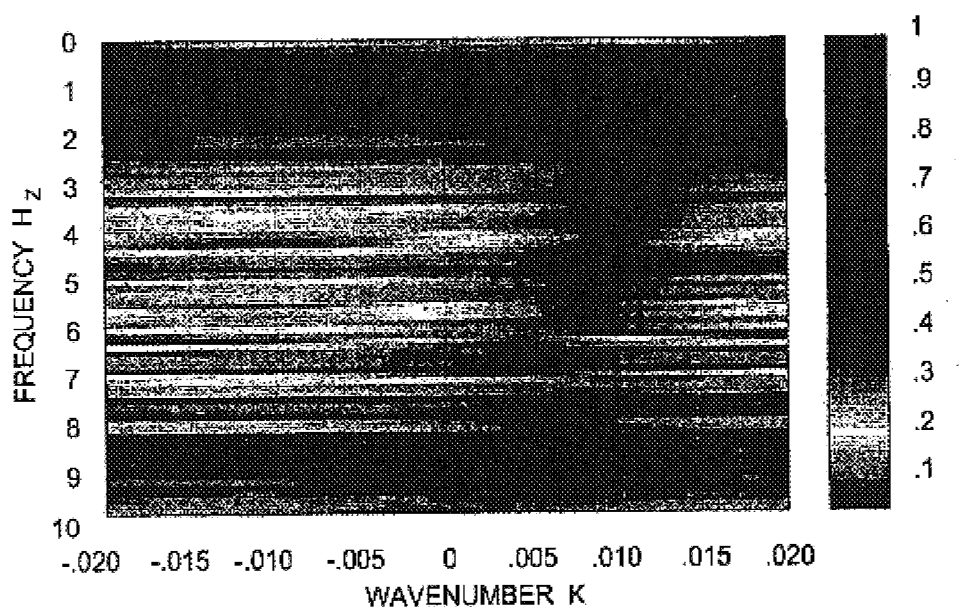
FIG. 4 illustrates the fk-plot of two traces.
Figure 5:
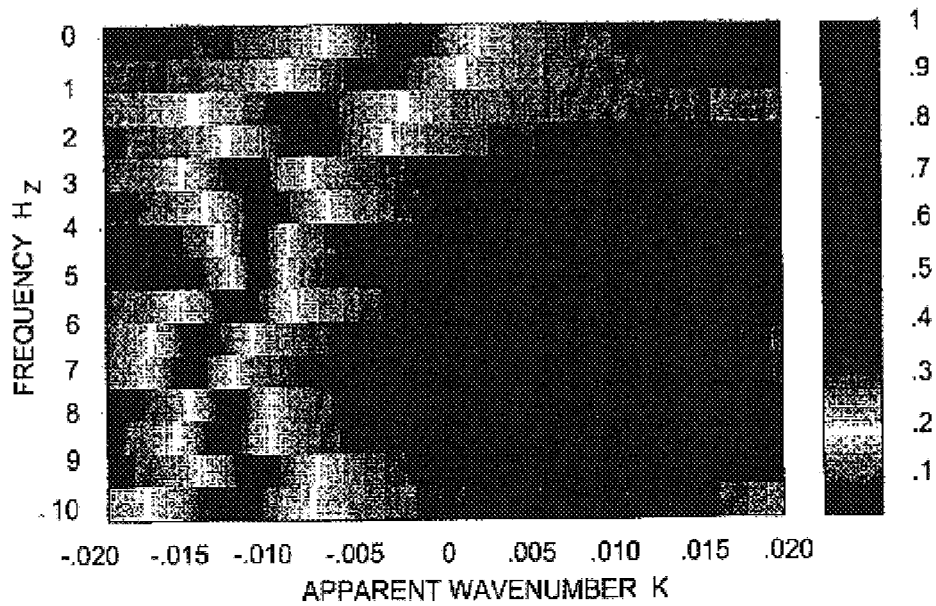
FIG. 5 shows the fk-MUSIC estimate of the same two traces observed in FIG. 4.

Parametric methods (e.g., fkk-MUSIC and fk-MUSIC) can find wide-ranging applications in, for example, local velocity analysis and wavenumber estimation. Further, the methods may be extended to fkkk or sparse/irregular arrays. For the particular case of a 1D array, the fk-Music is applied. FIG. 4 illustrates the fk-plot of two traces. FIG. 5 shows the fk-MUSIC of the same two traces. The difference in resolution is clearly evident by comparison.

While the present invention has been described with reference to specific embodiments, it should be understood by those skilled in the art that various changes may be made and equivalents may be substituted without departing from the true spirit and scope of the invention. In addition, many modifications may be made to adapt a particular situation, material, or process to the objective, spirit and scope of the present invention. All such modifications are intended to be within the scope of the invention.

All references cited herein are to aid in the understanding of the invention, and are incorporated in their entireties for all purposes.

What is claimed is:

1. A method for processing seismic data, comprising:
applying a temporal Fourier transform to the seismic data to generate Fourier transformed data;
applying a spatial wavenumber estimation based on a parametric algorithm to the Fourier transformed data;
generating a wavenumber spectrum from the parametric algorithm; and
using the wavenumber spectrum in one or more seismic applications.

2. The method of claim 1, wherein applying the spatial wavenumber estimation comprises selecting a frequency span around a frequency.

3. The method of claim 1, wherein applying the spatial wavenumber estimation comprises generating a spatio-spectral correlation matrix.

4. The method of claim 3, wherein applying the spatial wavenumber estimation further comprises decomposing the spatio-spectral correlation matrix to noise and signal subspace.

5. The method of claim 4, wherein the decomposing step is performed using an eigenvalue decomposition method.

6. The method of claim 5, wherein the eigenvalue decomposition method uses eigenvalues with a magnitude threshold.

7. The method of claim 1, wherein the parametric algorithm is a MUSIC algorithm.

8. The method of claim 1, wherein the parametric algorithm is Minimum Variance algorithm, Eigenvector algorithm, Maximum Likelihood algorithm, Pisarenco algorithm, an ARMA, AR or MA algorithm or Maximum Entropy algorithm.

9. The method of claim 1, wherein applying the spatial wavenumber estimation comprises selecting a frequency span around a frequency, generating a spatio-spectral correlation matrix, decomposing the spatio-spectral correlation matrix to noise and signal subspace, and wherein the parametric algorithm is a MUSIC algorithm, Minimum Variance algorithm, Eigenvector algorithm, Maximum Likelihood algorithm, Pisarenco algorithm, an ARMA, AR or MA algorithm or Maximum Entropy algorithm.

10. The method of claim 1, wherein the parametric algorithm is applied to data from equidistant spatial sampling.

11. The method of claim 1, wherein the parametric algorithm is applied to data from sparse spatial sampling.

12. The method of claim 11, wherein parameters passed to the parametric algorithm are selected from the group of order of Fourier transform, sampling frequency, distance between receivers in an x direction, distance between receivers in a y direction, number_of_sources, or f_span.

13. The method of claim 12, wherein the f_span passed as a parameter to the parametric algorithm determines a temporal frequency domain resolving the wavenumber spectrum.

14. The method of claim 12, wherein the number_of_sources is passed to the parametric algorithm.

15. The method of claim 14, wherein the number_of_sources is not greater than the number of signals.

16. The method of claim 1, wherein the seismic data is acquired from a one dimensional array of sensors.

17. The method of claim 16, wherein the seismic data is fed into the parametric algorithm as an M×L matrix, wherein M is the number of signals in a one dimensional array and L is the number of samples per sensor.

18. The method of claim 16, wherein the generated wavenumber spectrum is a one-dimensional fk spectrum for each frequency span.

19. The method claim 18, further comprising generating an fkk spectrum 3D volume.

20. The method of claim 1, wherein the seismic data is acquired from a two dimensional array of sensors.

21. The method of claim 19, wherein the seismic data is fed into the parametric algorithm as an MN×L matrix, wherein MN is the number of signals in a two dimensional array and L is the number of samples per sensor.

22. The method of claim 19, wherein the generated wavenumber spectrum is a two-dimensional fkk spectrum for each frequency span.

23. The method claim 21, further comprising generating an fkk spectrum 3D volume.

24. The method of claim 1, wherein the seismic data is acquired from a three dimensional array of sensors.

25. The method of claim 24, wherein the seismic data is fed into the parametric algorithm as an MNO×L matrix, wherein MNO is the number of signals in a three dimensional array and L is the number of samples per sensor.

26. The method claim 24, wherein the generated wavenumber spectrum is a three-dimensional fkkk spectrum for each frequency span.

27. A method for processing seismic data, comprising:
acquiring seismic data from a three dimensional array of sensors;
applying a temporal Fourier transform to the seismic data to generate Fourier transformed data;
applying a spatial wavenumber estimation based on a parametric algorithm to the Fourier transformed data;
generating a three-dimensional fkkk spectrum for each frequency span from the parametric algorithm; and
generating an fkkk spectrum 4D image.

28. The method of claim 1, wherein the seismic applications include a velocity analysis.

* * * * *